US012115951B2

(12) United States Patent
Conrad et al.

(10) Patent No.: US 12,115,951 B2
(45) Date of Patent: Oct. 15, 2024

(54) LIQUID EJECTION DEVICE FOR A VEHICLE WASHING SYSTEM AND METHOD FOR ITS OPERATION

(71) Applicant: WASHTEC HOLDING GMBH, Augsburg (DE)

(72) Inventors: Ferdinand Conrad, Augsburg (DE); Felix Dürndorfer, Augsburg (DE)

(73) Assignee: WashTec Holding GmbH, Augsburg (DE)

( * ) Notice: Subject to any disclaimer, the term of this patent is extended or adjusted under 35 U.S.C. 154(b) by 670 days.

(21) Appl. No.: 17/282,158

(22) PCT Filed: Oct. 4, 2019

(86) PCT No.: PCT/EP2019/076876
§ 371 (c)(1),
(2) Date: Apr. 1, 2021

(87) PCT Pub. No.: WO2020/070269
PCT Pub. Date: Apr. 9, 2020

(65) Prior Publication Data
US 2021/0354667 A1    Nov. 18, 2021

(30) Foreign Application Priority Data
Oct. 5, 2018   (DE) ..................... 10 2018 124 657.9

(51) Int. Cl.
*B01F 35/21*   (2022.01)
*B01F 35/71*   (2022.01)
(Continued)

(52) U.S. Cl.
CPC ........... *B60S 3/04* (2013.01); *B01F 35/21112* (2022.01); *B01F 35/2113* (2022.01);
(Continued)

(58) Field of Classification Search
None
See application file for complete search history.

(56) References Cited

U.S. PATENT DOCUMENTS

| 4,571,092 A | 2/1986 | Switall |
| 11,534,325 B2 | 12/2022 | Hvid |

(Continued)

FOREIGN PATENT DOCUMENTS

| CN | 203061123 U | 7/2013 |
| CN | 204364157 U | 6/2015 |

(Continued)

OTHER PUBLICATIONS

International Search Report, Written Opinion, and International Preliminary Report on Patentability for PCT/EP2019/076876 filed Oct. 4, 2019.

(Continued)

*Primary Examiner* — Levon J Shahinian
(74) *Attorney, Agent, or Firm* — Paul D. Bianco; Stephen Bongini; Fleit Intellectual Property Law

(57) ABSTRACT

A liquid ejection device for a vehicle washing system includes a reservoir volume, a first supply line coupled upstream to the reservoir for supplying a first liquid with a first supply rate and a second supply line coupled upstream to the reservoir for supplying a second liquid with a second supply rate. The device further comprises a removal line coupled downstream to the reservoir with a blocking device for blocking liquid flow through the removal line, and a detection unit for detecting liquid volume in the reservoir and a mixing ratio of the liquids introduced into the reservoir; and a removal device for ejecting the liquid found in the reservoir through an ejection element coupled to the removal line. In addition, the device comprises a control unit which is coupled to the detection unit and the removal device and is set up to start an ejection process by the (Continued)

removal device upon reaching a predetermined liquid volume and a predetermined mixing ratio.

20 Claims, 3 Drawing Sheets

(51) Int. Cl.
*B01F 35/88* (2022.01)
*B60S 3/04* (2006.01)
*G05D 11/13* (2006.01)
*B01F 101/24* (2022.01)

(52) U.S. Cl.
CPC .. *B01F 35/717613* (2022.01); *B01F 35/8821* (2022.01); *G05D 11/133* (2013.01); *G05D 11/138* (2013.01); *B01F 2101/24* (2022.01)

(56) References Cited

U.S. PATENT DOCUMENTS

| | | |
|---|---|---|
| 2002/0175183 A1 | 11/2002 | Schell et al. |
| 2013/0104668 A1 | 5/2013 | Hanko |
| 2017/0348137 A1 | 12/2017 | Hvid |
| 2020/0390586 A1 | 12/2020 | Hvid |

FOREIGN PATENT DOCUMENTS

| | | |
|---|---|---|
| CN | 107106758 A | 8/2017 |
| CN | 108211969 A | 6/2018 |

OTHER PUBLICATIONS

International Preliminary Report on Patentability for PCT/EP2019/076876, filed Oct. 4, 2019.
English Summary of Office Action dated Dec. 26, 2023 for Chinese Application No. 201980064731.3.

LIQUID EJECTION DEVICE FOR A VEHICLE WASHING SYSTEM AND METHOD FOR ITS OPERATION

FIELD OF THE INVENTION

The present invention relates to a liquid ejection device for a vehicle washing system having a reservoir volume, a first supply line coupled upstream to the reservoir volume for supplying a first liquid with a first supply rate and a second supply line coupled upstream to the reservoir volume for supplying a second liquid with a second supply rate. It further comprises a removal line coupled downstream to the reservoir volume with a blocking device for blocking a liquid flow through the removal line and a detection unit for detecting a liquid volume in the reservoir volume and a mixing ratio of the liquids introduced into the reservoir volume. It additionally comprises a removal device for ejecting the liquid in the reservoir volume with an ejection rate using an ejection element coupled to the removal line. The invention further relates to a method for operating a liquid ejection device for a vehicle washing system. Here, a first liquid with a first supply rate and a second liquid with a second supply rate are supplied to a reservoir volume. A liquid flow out of the reservoir volume is blocked by means of a blocking device coupled downstream to the reservoir volume, and a liquid volume in the reservoir volume and a mixing ratio of the liquids introduced into the reservoir volume are detected.

BACKGROUND OF THE INVENTION

In various technical fields of application, liquids have to be mixed with one another in as exact a ratio as possible. For example, detergents are provided in a highly concentrated form and diluted with water for use. Here, it is particularly desirable to be able to fittingly set the concentration for the respective application and to be able to adjust to the current requirements. With mixtures of liquids, in particular chemicals and water, reference can be made to a "dye bath" or "chemical bath".

It is known, for example, to introduce a first liquid into a current of a second liquid, for example in order to dilute detergent in water in a vehicle washing system. Here, it has proved to be disadvantageous that it is only possible to switch between different concentrations with a significant delay, for example when different concentrations are to be supplied to wash wheel rims with different levels of dirt on them. This is caused, for example, by the mixture last used being in the lines and other components of the system and firstly having to be washed out of the line before another mixture can be provided.

In addition, the power of pumps for feeding concentrated detergent into a flow of water is often limited. However, in order to achieve high concentrations in the resulting mixture, the means must be fed in with a high flow rate. Thus, several or particularly large pumps must be provided, which have an unfavourable effect on the costs of such a system. For example, pneumatic piston pumps can be used in which a volume per piston stroke can be set mechanically. However, these solutions have proved to be too inflexible when variable volumes are to be dosed.

SUMMARY OF THE INVENTION

One aspect of the present invention relates to a device and a method of the kind mentioned above by means of which mixing ratios can be quickly varied in a particularly wide range.

Advantageous designs and developments are disclosed herein.

The liquid ejection device of the kind mentioned above is characterised by a control unit which is coupled to the detection unit and the removal device and is set up to start an ejection process by means of the removal device upon reaching a predetermined liquid volume and a predetermined mixing ratio.

In the device, the mixture of the liquids is advantageously ejected in portions with a predetermined volume, in particular after introducing a certain amount of liquid, for example in order to apply the liquid to a surface. In addition, the desired mixing ratio is advantageously produced first and the liquid is then ejected, such that a defined ejection, for example of a certain detergent concentration, is ensured.

In a design of the invention, the removal device is formed in such a way that the removal rate is greater than the sum of the maximum achievable first and second supply rate. Here, the removal rate can be changed temporally and can denote the maximum ejection rate, for example. Thus, the ejection can advantageously be carried out more quickly or with a higher pressure than the supply of the liquids into the reservoir volume. This makes it possible for the predetermined total volume to firstly be introduced into the reservoir volume and only then be ejected. The achievable ejection speed is thus independent of the maximum introduction speed.

The liquid ejection device can have a supply device. In a further design, the control unit is furthermore coupled to the supply device for the second liquid and set up to regulate the second supply rate in such a way that the predetermined mixing ratio of the first and second liquid is achieved in the reservoir volume. Thus, the mixing ratio can be advantageously achieved by regulating a supply rate. However, instead of the supply rate for the second liquid, the supply rate for the first liquid or for both liquids could also be regulated.

In particular, the supply of the first liquid is not regulated or only roughly, for example by switching the supply on and off or by opening and closing a valve. In contrast, the second supply rate is regulated, in particular, by means of a dosing valve, a device for restricting the supply line for the first liquid or by means of controlling a supply unit for the second liquid, which can be comprised by the supply device.

Alternatively or additionally, in further designs of the invention, the first supply rate for the first liquid is regulated in such a way that the predetermined mixing ratio of the first and second liquid is achieved in the reservoir volume.

In the invention, the portioned ejection of the liquid, wherein this can also be referred to as "batch" supply or a supply in "batches", is in contrast to known devices, in which the liquids are simultaneously introduced into a continuous current and mixed or are stored in a pre-mixed manner. For example, a concentrated detergent is dosed into a continuous flow of water, or "injected", for example. Instead of this, in the invention, the mixture is not provided as a continuously mixed and ejected liquid flow, in which the second liquid is continuously dosed into the flow of the first liquid, but rather the first and the second liquid are firstly introduced into the reservoir volume in a desired ratio. The removal is then only carried out in particular after reaching a certain target volume and a certain mixing ratio.

Thus, practically any mixing ratios can be achieved, in particular also those in which the second liquid is present in a particularly high concentration. For example, a mixing ratio of 1% to 60% of the second liquid, preferably 10% to 50% of the second liquid, in the total liquid volume can be predetermined. When supplying into a flow of the first liquid, the second liquid would have to be introduced with a very high supply rate, which requires a correspondingly strong pump. This problem occurs, above all, when the removal rate is particularly high, that is to say when a large volume of the mixture has to be provided in a short amount of time. In contrast, with the device according to the invention, pumps with smaller dimensions suffice, in particular for supplying the second liquid, since the introduction into the reservoir volume can be carried out at a lower speed than would be necessary for the continuous emission.

The supply line and the removal line can be formed differently in inherently known ways. They can comprise valves, in particular, which prevent a flow of liquids in a direction that is not provided, for example check valves, pinch valves, electromagnetic valves or needle valves. In particular, several supply lines and/or removal lines can also be provided. For example, different supply lines can be provided for the first and second liquid.

The supply unit for the second liquid can be formed in an inherently known manner. Several supply units can be provided, in particular for several liquids. In particular, it can also be provided that the first and second liquid are supplied one after the other, that is to say sequentially, wherein a common supply unit, in particular, can be used. Furthermore, in one embodiment, the first and second liquid can be simultaneously supplied by means of a common supply unit.

In a further design, the supply device, in particular the supply unit, comprises an electric dosing pump, in particular having an electromagnetically driven piston. Thus, the supply is advantageously carried out in a particularly precise manner and can be controlled quickly, for example in order to be able to quickly and flexibly adjust the flow and the volume of the supplied liquid.

The second liquid can be supplied by the electric dosing pump; in further designs, the first liquid can also be supplied by it or a further electric dosing pump can be provided for supplying the first liquid.

In particular, the electric dosing pump is formed in such a way that the supplied volume can be controlled in relation to the running time, that is to say the total volume supplied and the rate of the supply can be adjusted during the supply. This distinguishes the electric dosing pump from alternatives, such as simple pneumatic piston pumps, which eject a fixedly predetermined volume or one that is to be set at least in advance. In other exemplary embodiments, other types of pumps can also be used.

In one design, the first liquid can be introduced with a constant volume flow. In particular, the first supply rate is substantially constant. A constant volume flow is to be understood, in particular, as a volume flow which deviates by less than ±5% from a target volume flow. Thus, the device can advantageously be formed particularly simply.

By way of example, water from a line can be introduced into the reservoir volume as the first liquid, wherein only one valve can be opened or closed during the supply and no further control of the first supply rate takes place. In particular, the throughflow amount is not measured directly during the supply of the first liquid, but rather it can only be determined by means of the total liquid amount introduced into the reservoir volume and by means of measuring the amount of the second liquid introduced. By the amount of introduced liquid in the reservoir volume being detected in the device, the supply of the second liquid is adjusted and regulated in such a way that a certain mixing ratio is achieved in the reservoir volume with a predetermined amount of liquid.

In the invention, the first and the second liquid are introduced into the reservoir volume in such a way that a predetermined mixing ratio is achieved. Furthermore, a certain target volume of the mixture is achieved. To do so, the volume introduced into the reservoir volume of the first or second liquid and/or the total volume of the mixture already introduced is detected. The detection unit can be formed in an inherently known manner to detect the total liquid volume in the reservoir volume.

In a design of the device according to the invention, the detection unit comprises a throughflow sensor for detecting the introduced volume of the first and/or second liquid. In this way, the introduced volume can advantageously be determined directly and particularly accurately.

The throughflow sensor is formed in an inherently known manner and can be arranged, for example, in a supply line for introducing the second liquid. Furthermore, the supply device, in particular the supply unit, can use a throughflow sensor or a corresponding device to detect the throughflow volume, wherein the throughflow is determined in particular directly by means of the activity of the supply unit, for example by means of the frequency with which a specific piston volume is introduced. Such a determination of the volume can be performed particularly easily, in particular with a piston pump. By integrating or totalling the throughflow over time, it can be determined which volume of the second liquid has been introduced into the reservoir volume. Furthermore, the introduced volume of the first liquid can be detected analogously.

Alternatively or additionally, the detection unit can comprise various other sensors or devices for detecting the total liquid volume introduced, for example a float in the reservoir volume or a corresponding unit.

The mixing ratio in the reservoir volume can be determined by means of the detected total liquid volume and the volume of the second liquid introduced. In particular, a concentration of the second liquid is determined. In further designs, it can be provided that more than two liquids are introduced, and the mixing ratio is the ratio of the volume of the second liquid to the total liquid volume.

In one design, the predetermined liquid volume and/or the predetermined mixing ratio are detected by a user, for example by means of an input. This can comprise a numerical input, for example, or it can be selected between different settings, to which a liquid volume and a mixing ratio are respectively allocated. For example, these can be different programs of the vehicle washing system.

The ejection process itself can be carried out in an inherently known manner, for example by means of a pump, which suctions liquid from the reservoir volume and emits it at a removal device. The ejection process can comprise an opening of the blocking device, in particular a blocking valve, of the removal line and/or closing further valves, and starting a pump to eject the mixture. In addition, it can be provided that the liquid is pressed out of the reservoir volume by the removal line. The removal device can thus be formed as a pump, for example, by means of which liquid can be suctioned out of the reservoir volume and can be ejected. Alternatively, it can be formed as a compressor, which builds a pressure in the reservoir volume, by means of which the liquid contained therein is pressed out.

The ejection element can be formed in an inherently known manner and can comprise a nozzle, for example. A liquid jet can be formed by the ejection element, shaped and deflected in a specific direction or in specific directions. Furthermore, the ejection element can comprise a pressure regulator, by means of which a pressure of the ejected liquid, for example, can be regulated.

The supply volume can be formed in various inherently known ways. It comprises a cavity, which can be sealed in a liquid-tight and, in particular gas-tight, manner to the outside space. To do so, it is provided, in particular, that openings of the reservoir volume, in particular for introducing or removing liquids and gases, can be blocked in a gas-tight manner by valves and/or a seal. Alternatively, the reservoir volume can be formed to be open, wherein a gas exchange, in particular, with other components or an exterior space is possible. If the liquid is a wheel rim cleaner, the reservoir volume preferably holds 50 ml to 300 ml, particularly preferably 100 ml to 150 ml. If the liquid is a pre-cleaner, for example an insect cleaner, the reservoir volume preferably holds 5 l to 10 l.

In a further design, introducing liquid into the reservoir volume sealed in a gas-tight manner leads to an increase of an internal gas pressure in the reservoir volume. In this design, the detection unit is furthermore set up to detect the internal gas pressure in the reservoir volume when introducing the second liquid. In particular, the internal gas pressure corresponds to a pressure which has to be overcome in order to introduce the second liquid. Furthermore, the detection unit is set up to determine the volume introduced of the first and second liquid by means of the internal gas pressure detected of the reservoir volume. Here, it makes use of the fact that the internal gas pressure in the gas-tight reservoir volume increases as the volume of the liquid introduced increases.

Thus, the amount of liquid introduced into the reservoir volume can advantageously be monitored without additional measures having to be provided to do so. In particular, specific means for measuring the volume of the first liquid introduced or for dosing it can be dispensed with. The first liquid, for example water, can be supplied from a line without the pressure and the exact supply rate having to be measured or controlled exactly. Instead, the volume of the liquid introduced is determined by means of the pressure which is constructed in the reservoir volume sealed in a gas-tight manner when supplying the first and/or second liquid. This is caused, in particular, by a gas being present in the reservoir volume which can be compressed in contrast to the liquid introduced, and its volume being reduced as the supply of the liquids increases. For example, when removing the liquid from the reservoir volume and/or when ventilating the system, the gas, in particular air, can penetrate into this. Furthermore, a sealable ventilation opening can be provided. Typically, the compressed gas occupies ½ to ⅛ of the total volume.

The pressure detection can be carried out in an inherently known manner, wherein various known pressure sensors can be used in order to directly measure the internal gas pressure in the reservoir volume. When introducing the first liquid into the reservoir volume, the pressure can also be measured.

In a development, the supply device, in particular the supply unit, comprises a pressure detection element for detecting the internal gas pressure. This is coupled to the detection unit, in particular. Thus, it is advantageously possible to determine the internal gas pressure in the reservoir volume when introducing the second liquid with the aid of the supply unit.

In particular, it is determined which counterpressure of the reservoir volume has to be overcome in order to supply the second liquid. In particular, the force is measured against which an electromagnetically driven conveying device of an electric dosing pump works. By means of such a measuring, the pressure in the reservoir volume can be determined. The pressure detection element can furthermore be comprised by the detection unit, or the detection unit can be coupled to it and can detect the internal gas pressure by means of the pressure detection element.

In a further design, the pressure detection element is set up to detect a power consumption of the supply device, in particular the supply unit, and to determine the internal gas pressure by means of the power consumption. In particular, at a certain supply rate, the greater the power required to supply the second liquid, the greater the internal gas pressure. The supply unit here comprises an electrical dosing pump, in particular. Thus, the internal gas pressure can advantageously be determined as the counterpressure when supplying the second and/or first liquid in indirect manners without a specific device, for example a sensor, having to be arranged in the reservoir volume, for example, in order to do so. As the pressure detection element, a component can be used, for example, which detects the power consumption or a specific part of the whole power consumption of the supply unit and is coupled to the detection unit in such a way that it can determine the internal gas pressure by means of the data detected. Such a component can be integrated into the supply unit, for example.

The power consumption of the pump is proportional to the product of the volume flow and the pressure difference against which the pump works. The volume flow is constant. Usually, it can be predetermined, i.e. a target value for a regulating circuit. In the pump, the voltage, for example, is regulated in such a way that a corresponding volume flow is ejected. To do so, the stroke of a stroke magnet, for example, is detected. If the voltage in the pump is increased, the current and thus the power of the pump increases. Thus, the counterpressure can be ascertained from the power against which pressure the pump works. This counterpressure can then be emitted from the pump.

During operation, a target value can be input for the volume flow, for example. Then, the regulator of the pump emits the counterpressure. This counterpressure still contains the pressure of the fluid when feeding in the fluid and frictional losses in the line. However, these pressures are constant, such that the internal gas pressure in the reservoir volume emerges from the pressure differences.

Determining the internal gas pressure by means of the power consumption of the pump has the advantage that a separate pressure sensor is not required. Furthermore, there are no additional parts that come into contact with the second liquid. Moreover, no additional sealing surfaces emerge, and no electronic components are in the vicinity of the second liquid, which can be a chemical.

In one design, the control unit is set up to determine a current mixing ratio of the liquid in the reservoir volume by means of the pressure detected and the volume introduced of the first and/or second liquid. Alternatively or additionally, the liquid volume in the reservoir volume and/or a volume of the second liquid still to be introduced is determined. Thus, the mixing volume can be advantageously exactly monitored and, where necessary, quickly adjusted.

For example, it can be provided that the internal gas pressure of the reservoir volume is detected periodically within predetermined time intervals, and the volume of the amount of liquid in the reservoir volume is determined by means of this pressure. The current mixing ratio can be determined, in particular, by means of the detected total liquid volume and a volume of the supplied second liquid measured by means of the throughflow. Using this method, the current mixing ratio can be determined without the volume having to be measured individually for both liquids.

In one design, the removal device comprises a gas supply unit, and the control unit is set up to open the blocking device during the ejection process and to introduce an expulsion gas into the reservoir volume through the gas supply unit in such a way that the mixture is driven out of the reservoir volume with the first and second liquid. The gas supply unit can comprise, in particular, a port for pressurised air or a compressor. Thus, the reservoir volume can advantageously be supplied with gas pressure in such a way that liquid found therein, in particular the mixture produced there, is driven out particularly quickly and completely. In a further design, the expulsion gas can be introduced and supplied with pressure in such a way that the blocking device is opened by this pressure.

A prerequisite for the ejection by means of an expulsion gas is that the reservoir volume is sealed in a gas-tight manner, and the constructed pressure can only be diverted through the removal opening by simultaneously ejecting the liquid mixture. The gas-tight seal of the reservoir volume must withstand, in particular, the pressure of the expulsion gas introduced, wherein, if necessary, an overpressure valve is provided. Here, it can be provided that a gas with a pressure of from 4 to 8 bar, preferably 6 bar, is introduced into the reservoir volume. In doing so and as a result of the suitable control of the supplied pressure, it can be achieved that the mixture of the liquids is ejected from the reservoir volume with a defined pressure, for example in order to achieve an even spraying image and a homogenous cross-linking of the surface.

In contrast to this, the removal of liquids is usually carried out by means of a pump, and the expulsion by means of a gas is only known in order to empty a removal device, for example injection nozzles or pipes, and/or to prevent dripping. In this case, residual liquid, in particular, is driven out. In contrast to this, with the device according to the invention, the whole ejection of the mixture can be driven by means of air pressure.

When ejecting the liquid mixture, it can be provided that the blocking device is controlled in such a way that the removal opening only releases in order to remove or to eject the liquid. The blocking device can furthermore be set up in such a way that, when a specific pressure in the reservoir volume is exceeded, it opens, for example as an overpressure valve, or a control to actively open the valve can be provided. In addition, with further openings, in particular with a supply opening, valves can be provided which function as check valves and thus prevent a part of the pressure being diverted via the supply openings.

Furthermore, by driving out the mixture by means of a gas supplied with pressure, the reservoir volume can be completely emptied; additionally, dripping can be prevented. In particular, the reservoir volume can still only be substantially filled with the gas, for example air, after driving out the liquid mixture. When the first and second liquid are now supplied again, the mixing ratio is not substantially distorted by residue of the mixture removed in advance. In addition, the reservoir volume, a removal line and/or removal devices being filled with aggressive liquids for longer than necessary or being in contact with these can be avoided.

In a further design, the first and/or second supply line is coupled to the reservoir volume in an upper region. Here, the upper region is formed in such a way that it is not arranged below the liquid level even when introducing a maximum amount of liquid into the reservoir volume. This advantageously makes it possible for the first and/or second liquid to be introduced in such a way that the counterpressure acting here corresponds to the internal gas pressure. For example, at least the second liquid is introduced against the pressure of a gas found in the reservoir volume.

The "upper region" is thus defined by the effect of gravity in such a way that gases rising in a liquid move in its direction and accumulate in the upper region. Inversely, liquids are collected in a lower region of the reservoir volume.

Furthermore, it can be provided that, in the lower region of the reservoir volume, the removal line is coupled to it, wherein the upper region is below the liquid level, in particular even with a small amount of liquid introduced. Thus, the removal can be carried out particularly efficiently by the removal line. The coupling of the removal line can be arranged at the deepest point of the reservoir volume, for example, such that, when the target volume of the mixture is achieved, it is substantially completely covered by the mixture until the removal is finished, and this can be removed by it. In particular, several supply lines and/or removal lines can be provided.

In a further design, the reservoir volume is formed completely by a liquid line. Such a line can be formed, for example, by a tube and is characterised by an elongated extension and a substantially constant cross-section, which is small in comparison to the length of the line. In particular, the length is at least one hundred times, preferably at least five hundred times, the diameter of the line. The liquid line has an end which is connected to a removal device, for example a line system, to divide liquids and/or an ejection element, for example a nozzle. In this case, the liquid line, in particular, is provided with a pressure bladder, for example a pressure membrane bladder or an air chamber. Thus, a cavity is advantageously used as the reservoir volume which is already present in typical devices in order to lead the mixture to a removal device. Existing systems can thus be adjusted or converted particularly easily. Openings for introducing and/or removing liquids from the liquid line can be arranged, for example, by means of bores in the line wall.

According to another embodiment in which a pressure bladder is only optionally used, the liquid line forming the reservoir volume can be filled as followed:
Firstly, the liquid line is only filled with gas. The pressure in the liquid line is atmospheric pressure. The blocking valve is now closed and the liquids dosed, that is to say against the gas pressure inside the liquid line, which increases since the system is closed in a gas-tight and pressure-tight manner. The geometry of the liquid line is formed, in particular, in such a way that gas in the liquid line can flow past the dosed liquid, such that the gas is collected in the upper part of the liquid line. In the ejection process by means of the removal device, expulsion gas can flow in with a pressure which is higher than the pressure in the compressed gas in the reservoir volume, such that, in doing so, the liquid is driven out of the reservoir volume when the blocking valve is open.

In a development, the first and/or second liquid comprises a detergent. Advantageously, the device can thus be used in order to dose the detergent as needed. For example, it can be means to clean rims of a vehicle. The device makes it possible to particularly flexibly dose this means, for example in order to treat rims corresponding to the amount of dirt on them and to avoid concentrations that are too high or too low.

In a development, a branching line for distributing the ejected liquid to at least two ejection elements is arranged downstream of the blocking device. Thus, several ejection elements can advantageously be provided with liquid. The branching line can comprise a T-piece or a device with several ports, for example, to which the ejection elements are attached further downstream.

The method according to the invention of the kind mentioned above is characterised in that the blocking device is opened and an ejection process is started with a removal rate when a predetermined total volume and a predetermined mixing ratio are reached.

In particular, the method according to the invention is formed for operating the device according to the invention described above. Thus, the method has the same advantages as the device according to the invention.

With the method according to the invention, a high ejection rate can advantageously be achieved even when the supply into the reservoir volume can only be carried out with slower rates. With the invention, the removal rate, in particular, after reaching the predetermined liquid volume is independent of the rate with which the first and/or second liquid has been supplied.

In a design of the method according to the invention, the ejection rate is higher than the maximum supply rate. Thus, a particularly quick ejection can be achieved. In particular, the removal device for ejecting the liquid from the reservoir volume is formed in such a way that the maximum achievable ejection rate is greater than the sum of the maximum achievable first and second supply rates for the first or second liquid.

When starting the ejection process, the blocking device can be opened, and further valves, in particular with the supply opening, can be closed. Ejection can be carried out by means of a pump, or the mixture in the reservoir volume can be driven out by means of an expulsion gas supplied with pressure, in particular air.

In a further design, the liquid ejected from the reservoir volume is distributed to at least two ejection elements by a branching line arranged downstream of the blocking device. Thus, several ejection elements, for example nozzles, can advantageously be supplied with the liquid mixture from the reservoir volume at the same time. It can be provided that the liquid is distributed in such a way that it is ejected by the ejection elements with the same ejection rate. Furthermore, the ejection elements can be designed in such a way that the rate of the liquid ejection can respectively be adjusted or regulated.

In a development, the first liquid is supplied with a substantially constant first supply rate, in particular with a constant volume flow. Here, in particular, the second liquid is introduced with variable pressure, which is determined and regulated by means of the predetermined mixing ratio. A substantially constant first supply rate is to be understood as a supply rate which deviates by less than 2% from the mean. The method can thus be carried out particularly easily and with low effort on the control units, since a device for changing the first supply rate, for example, can be dispensed with.

BRIEF DESCRIPTION OF THE DRAWINGS

The invention is now explained by means of exemplary embodiments with reference to the drawings.

DETAILED DESCRIPTION OF THE INVENTION

Figure 1:
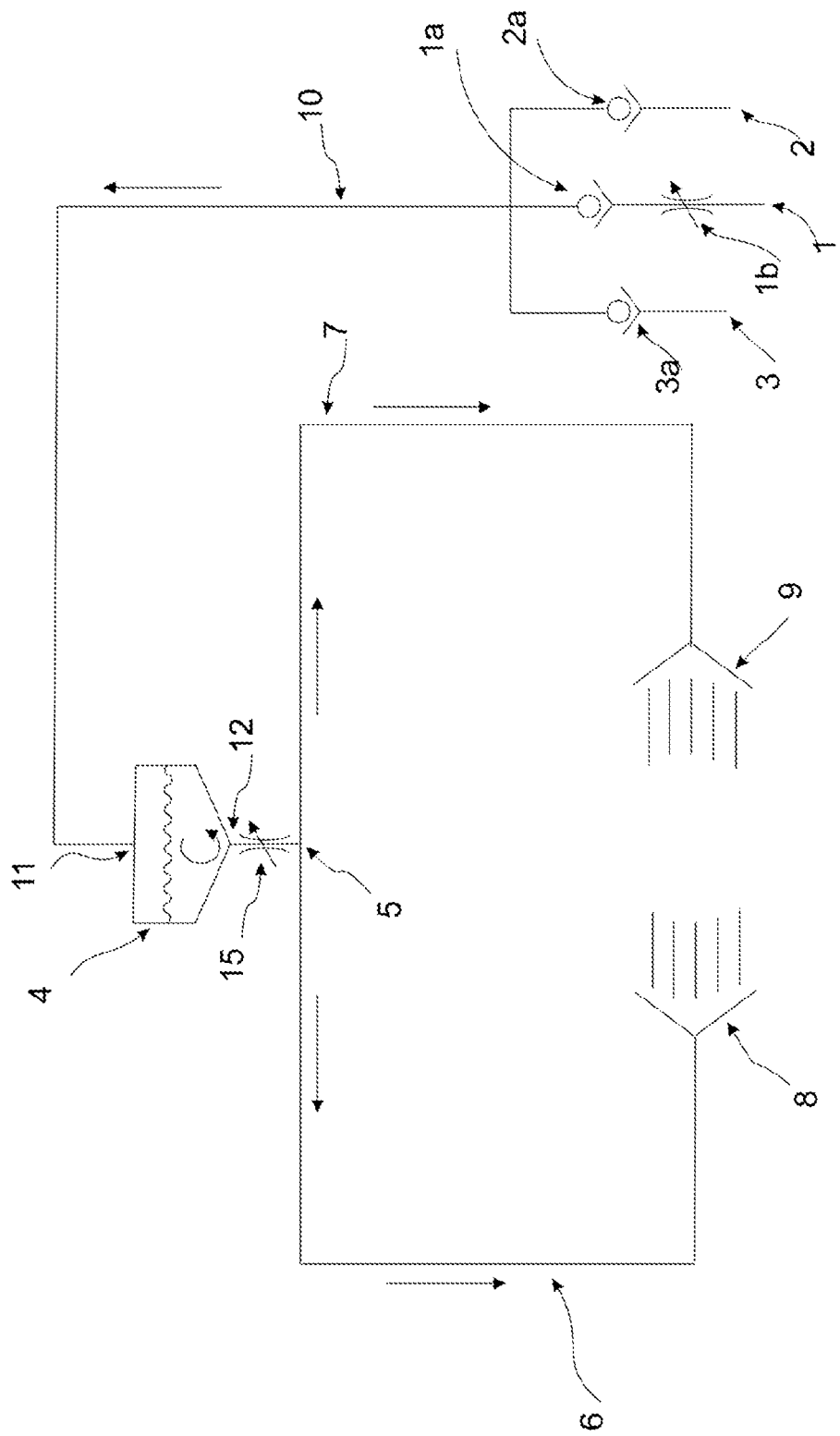
FIGS. 1 and 2 show a first exemplary embodiment of the liquid ejection device according to the invention.

An exemplary embodiment of the device according to the invention is explained with reference to FIGS. 1 and 2. Here, FIG. 2 shows a more detailed view than FIG. 1.

The device comprises a feed line 10, 210, which is attached to a supply opening 11, 211 of a storage container 4, 204. The storage container 4, 204 further comprises a removal opening 12, 212 to which a removal line is attached to form a T-piece 5, 205, wherein, in the removal line, a blocking device 15, 215, formed as a blocking valve 15, 215 and, in particular, as a pinch valve, is arranged. The line is branched into two distributor lines 6, 7, 206, 207 by the T piece 5, 205, said distributor lines leading to nozzles 8, 9 of a vehicle washing system. A different branching line can also be used instead of the T-piece 5, 205. In the exemplary embodiment, the storage container 4, 204 is sealed in a gas-tight manner when the blocking device 15, 215 is closed. In this case, an exchange of fluids can be carried out by the supply opening 11, 211, wherein the feed line 10, 210 attached to this can, however, be sealed in a gas-tight manner by closing the attached valves.

A chemical supply 2, 202 with a check valve 2a, 202a and an air supply 3, 203 with a further check valve 3a, 203a are attached to the feed line 10, 210. Here, the chemical supply 2, 202 is connected to a supply unit 222, in particular an electrical dosing pump 222, by means of which a liquid, in particular a detergent, can be supplied. The electrical dosing pump 222 comprises a pressure detection element 222a. Moreover, the air supply 3, 203 is connected to a gas supply unit 223, in particular an air compressor or a different source of pressurised air. Downstream of this, a further check valve 1a, 201a, an electromagnetic water valve 201c, a throttle 1b, 201b and a water supply 1, 201 attached to a water supply device are provided in the feed line 10, 210. In the exemplary embodiment, the storage container 4, 204 and a feed line 10, 210 thus form a reservoir volume which can receive a certain fluid volume.

A control unit 230 is provided to control the device, said control unit comprising a detection unit 231 and being coupled to the electromagnetic water valve 201c, the electrical dosing pump 222, the gas supply line unit 223 and the blocking valve 15, 215.

Water is fed from the water supply 1, 201 into the feed line 10, 210 with a constant pressure, wherein the water volume flow can be set by means of the throttle 1b, 201b. Furthermore, the water supply can be switched on and off by means of the electromagnetic water valve 201c. The supplied water passes the check valve 1, 201a. The further check valve 3a, 203a prevents the water penetrating in the direction of the air supply 3, 203. The water flow further passes the coupling to the chemical supply 2, 202, wherein, here, a check valve 2a, 202a also prevents the water penetrating. Finally, it reaches the storage container 4, 204 through the supply opening 11, 211.

In further exemplary embodiments, at least one through-flow sensor can be provided which can be arranged in the feed line 10, 210, for example. Furthermore, it can be arranged in the region of the water supply 1, 201 and/or the chemical supply 2, 202.

An exemplary embodiment of the method according to the invention is explained with reference to FIGS. 1 and 2.

In the exemplary embodiment of the method, in a base state, the blocking valve 15, 215 is closed, such that the storage container 4, 204 is sealed in a gas-tight manner up to the supply opening 11, 211. The storage container 4, 204 and, in particular, also the feed line 10, 210 are filled with air in the base state. Thus, it leads to an increase of the air pressure in the empty storage container 4, 204 when introducing liquid into the storage container 4, 204. The introduced liquid cannot be compressed, such that the liquid volume introduced into the storage container 4, 204 can be determined by means of the internal gas pressure. This is carried out by means of the Boyle-Mariotte law, which describes the relation between pressure and volume of an ideal gas under isothermal conditions. For the purposes of the invention, the description as an ideal gas is sufficient, yet modifications and corrections for adjusting the calculation process to the real circumstances can also be provided.

In the base state, the volume $V_1$ of the empty storage container 4, 204 corresponds to the volume $V_1$ of the gas found inside it. In the first state, this has the pressure $p_1$ which corresponds, in particular, to the ambient pressure. After introducing a volume $V_3$ of liquid, the gas found in the storage container 4, 204 assumes a reduced volume $V_2$, which is calculated according to the difference $V_2 = V_1 - V_3$. Since the liquid volume $V_3$ cannot be compressed, the pressure $p_2$ of the gas increases as a result of the reduced volume according to the equation:

$$p_1 * V_1 = p_2 * V_2$$

From this, the following emerges for calculating the liquid volume $V_3$ introduced:

$$V_3 = V_1 * (1 - p_1/p_2)$$

Alternatively or additionally, other estimations can be used to calculate the liquid volume introduced by means of the internal gas pressure $p_1$, $p_2$.

In the exemplary embodiment, the internal gas pressure $p_1$, $p_2$ is detected by the pressure detection element 222a, which detects the power consumption of an electrical dosing pump 222, by means of which the second liquid is supplied to the chemical supply 2, 202. In the exemplary embodiment, a detergent is pumped by the chemical supply 2, 202 and through the check valve 2a, 202a into the field line 10, 210. Here, the pump 222 works against the internal gas pressure in the storage container 4, 204, such that a higher power of the dosing pump 222 is necessary with increasing internal gas pressure to reach the same introduction rate of the detergent.

In the exemplary embodiment, a magnet-membrane dosing pump of the type gamma/X by the company ProMinent® is used as the dosing pump 222. This pump has a magnetic regulator which measures and releases the upcoming counterpressure. During operation, e.g. a target value of 27 ml/min is input for the volume flow. The regulator of the pump then displays the counterpressure. This counterpressure still contains the pressure of the liquid when feeding the liquid and frictional losses in the line. However, these pressures are constant, such that the internal gas pressure in the storage container 4, 204 or generally in a reservoir volume emerges from the pressure differences.

This means that liquid volume found in the storage container 4, 204 is determined by means of the internal gas pressure. This is advantageous, in particular, when there are no or only inexact possibilities for directly measuring the volume available, for example with a throughflow measuring at the water supply 1, 201 or in the feed line 10, 210.

At the same time, it is provided in the exemplary embodiment that the electrical dosing pump 222 measures the volume of the detergent pumped by it when feeding in the detergent. In other exemplary embodiments, a throughflow sensor can be used for this.

Additionally or alternatively, in further exemplary embodiments, a different sensor can be provided for measuring the liquid volume in the storage container 4, 204. For example, a float can be used or the mass of the liquid introduced can be determined.

Figure 2:
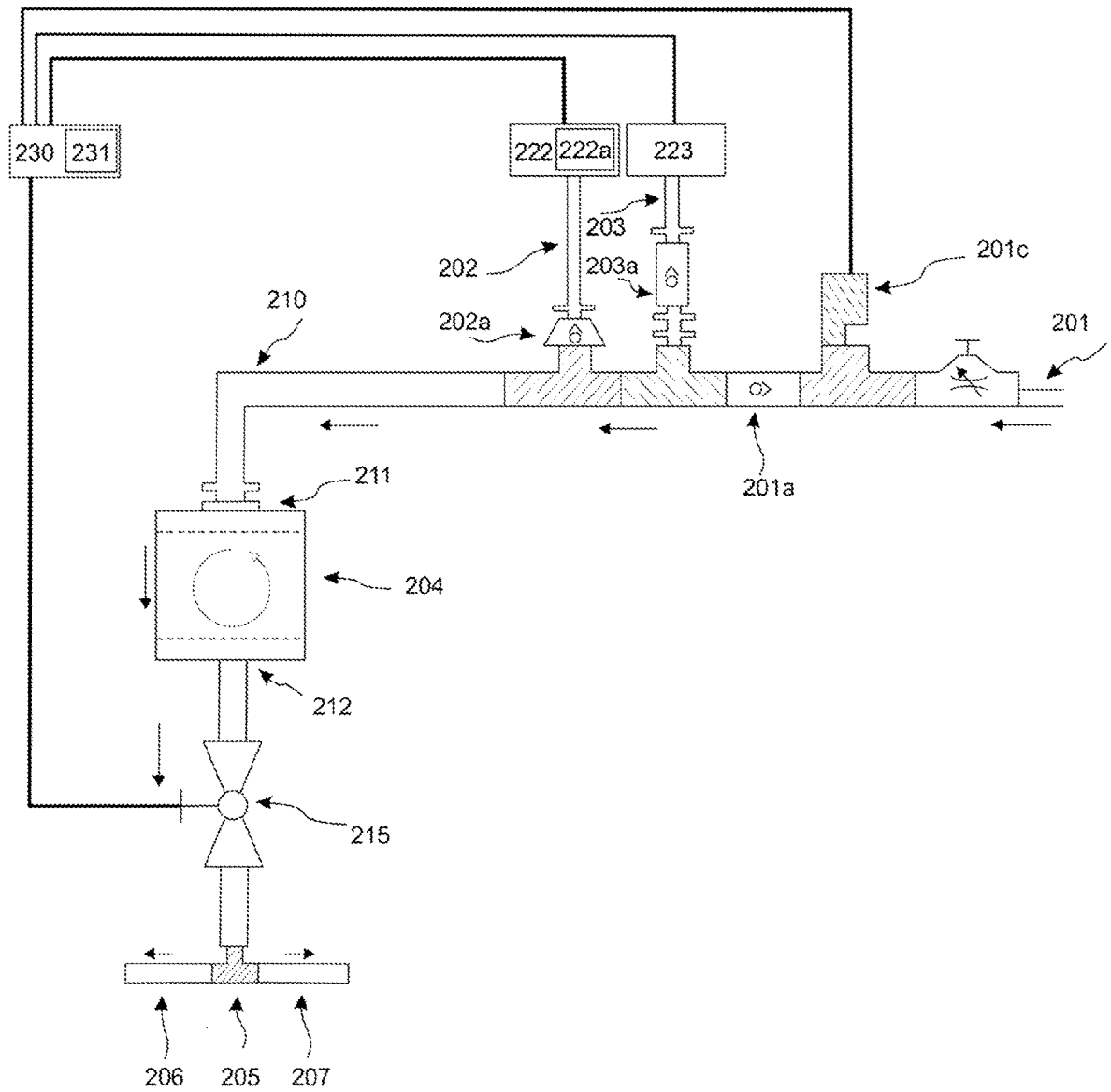

In the storage container 4, 204, the water is mixed with the detergent, which is indicated in FIGS. 1 and 2 by a round arrow. Here, the first and second liquid can be distributed homogenously in the liquid mixture. Additionally, in the exemplary embodiment, the injection of the mixture is carried out in such a way that an extensively homogenous mixture is achieved, in particular when applying to a surface, i.e. shortly after leaving the system. In a further exemplary embodiment, the mixing can be improved by an additional mixing device (not depicted).

A current mixing ratio between the water and the detergent emerges from the volume of the detergent fed in and the total liquid volume in the storage container 4, 204. The mixing ratio can also be adjusted by controlling the water supply 1, 201, for example by means of the throttle 1b, 201b and the electromagnetic water valve 201c, and/or the chemical supply 2, 202 by means of the dosing pump 222.

At the same time, in the exemplary embodiment, the liquid volume in the storage container 4, 204 is compared to a predetermined target volume. When the target volume is reached, which corresponds in particular to reaching a predetermined target pressure in the storage container 4, 204, the introduction of water and detergent is ended, in the exemplary embodiment by closing the electromagnetic water valve 201c and stopping the electrical dosing pump on the chemical supply 2, 202.

It is provided in the exemplary embodiment that the mixture is ejected from the storage container 4, 204 by means of pressurised air after reaching the target volume. For this, pressurised air is introduced at the air supply 203. The air supply 203 thus assumes the role of a removal device 223; alternatively or additionally, in other exemplary embodiments, another removal device 223 can be provided, for example a pump for ejecting the liquid from the storage container 4, 204. A pressure of 4 to 8 bar, preferably 6 bar, is provided. The check valve 201a prevents the pressure being diverted in opposition to the flow direction in the feed line 10, 210, and the air supplied with pressure reaches the storage container 4, 204. At the same time, the blocking valve 15, 215 is opened. Since the removal opening 12, 212 is arranged in the lower region of the storage container 4, 204, the amount of liquid found therein can be substantially completely ejected.

In further exemplary embodiments, it can be provided that the blocking valve 15, 215 is formed as an overpressure valve and automatically opens upon reaching a certain pressure, for example at a pressure of 6 bar. In addition, further valves can be provided, for example in the distributor lines 6, 7, 206, 207.

The liquid mixture ejected from the storage container 4, 204 is led into the distributor lines 6, 7, 206, 207 by the T-piece 5, 205 and there reaches the ejection elements 8, 9 which are not depicted in more detail in FIG. 1. In the exemplary embodiment, it is nozzles 8, 9 of a vehicle washing system.

In the exemplary embodiment, pressurised air is led into the storage container 4, 204 until it is completely emptied. Here, it is further provided that the attaching lines, in particular the T-piece 5, 205, and the distributor lines 6, 7, 206, 207 and, where necessary, the nozzles 8, 9 are also emptied and the liquid mixture is ejected completely through the nozzles 8, 9. In this way, possibly aggressive chemicals lingering unnecessarily long in the components of the system and dripping are prevented.

In a final step, the supply of the pressurised air is ended and the blocking valve 15, 215 is closed. Here, the storage container 4, 204 is filled with air at ambient pressure.

In further exemplary embodiments, the ejection can be carried out in a different manner, for example by introducing water or a different fluid under pressure or by suctioning out of the storage container 4, 204 by means of a pump and ejecting through the distributor line 6, 7, 206, 207.

Figure 3:
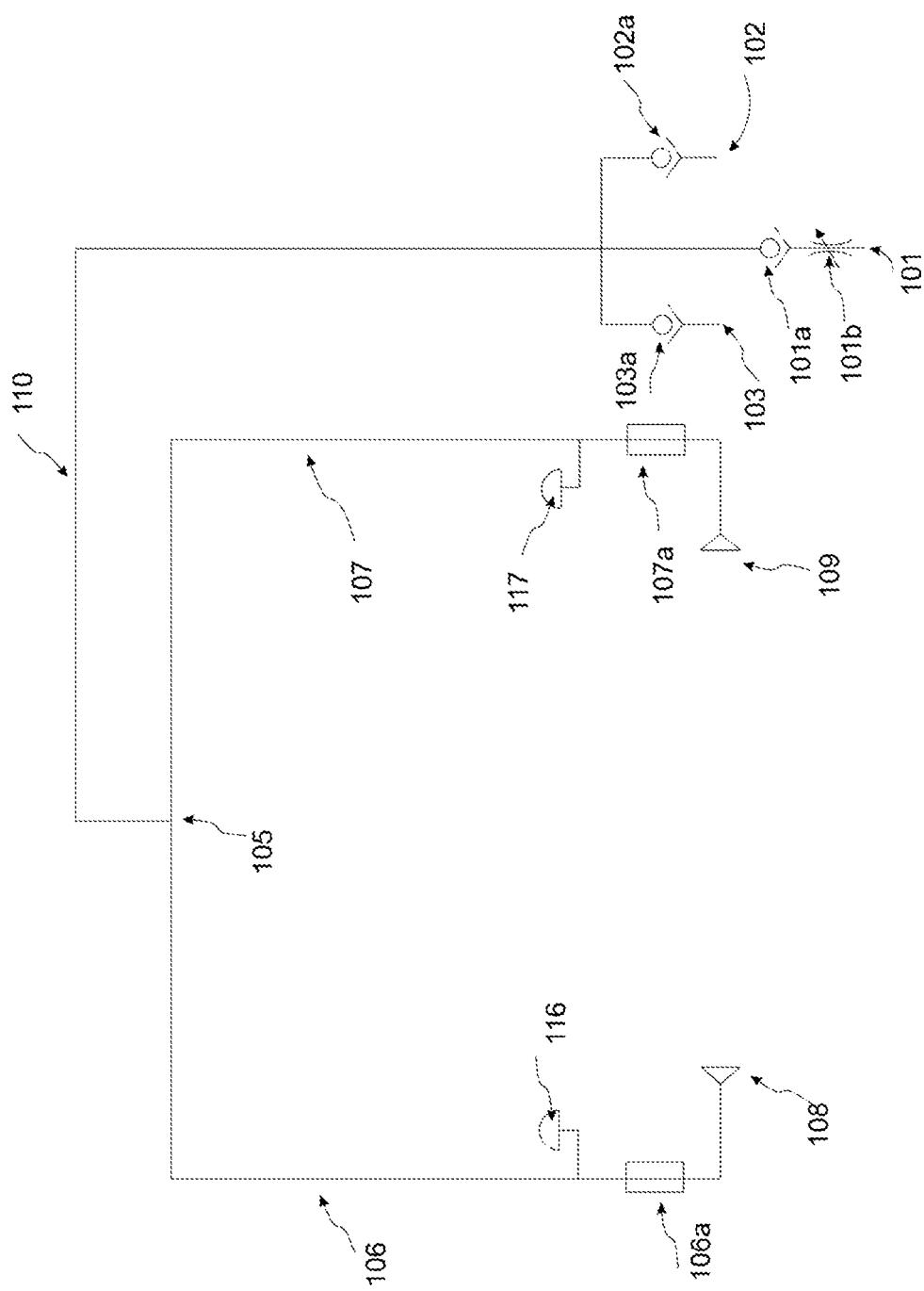
FIG. 3 shows a further exemplary embodiment of the liquid ejection device according to the invention.

With reference to FIG. 3, a further exemplary embodiment of the device according to the invention is explained. The present construction is fundamentally analogous to that shown in FIGS. 1 and 2. Thus, above all the differences are explained below.

In the further exemplary embodiment, it is provided that the storage container is formed by a feed line 110. Here, the feed line 110 is formed in such a way that it comprises a sufficiently large volume for the provision of the desired mixture.

For example, a 4 m long feed line 110 is provided which, with an internal diameter of 4 mm, contains a volume of about 50 ml and, with an internal diameter of 6 mm, a volume of about 113 ml of liquid. The feed line 110 leads to a T-piece 105 which can be formed in a different manner, for example in order to enable a rotation around the axis of the feed line 110. Distributor lines 106, 107 branch off from this T-piece 105 downstream, the length of which being 5 m in total, for example, which corresponds to a volume of about 63 ml with an inner diameter of 4 mm. Nozzles 108, 109 are provided at the end of the distributor lines 106, 107, by means of which nozzles a liquid can be sprayed out, for example onto rims of a vehicle in a vehicle washing system. The feed line 110 and the distributor lines 106, 107 thus form a reservoir volume into which fluid can be introduced.

Upstream at the other end of the feed line 110, a water supply 101 is attached to a throttle 101*b* and a check valve 101*a*, a chemical supply 102 to a check valve 102*a*, and an air supply 103 to a check valve 103*a*.

In the exemplary embodiment shown here, it is provided that a constant flow of water is led into the feed line 110 through the throttle 101*b*. Furthermore, it is provided that a detergent is injected at the chemical supply 102, wherein an electrical dosing pump is used. In each case, a valve 106*a*, 107*a* that is gas and liquid-tight is provided in the distributor lines 106, 107, said valve being able to be respectively opened by an electrical signal at a certain pressure, for example 5 bar. In each case, a pressure bladder 116, 117 is arranged in front of each valve 106*a*, 107*a* in the distributor line 106, 107. As with the storage container 4, 204, gas is compressed in the pressure bladders 160, 117. Thus, when introducing water and detergent, a pressure is constructed in the feed line 110 and the distributor lines 106, 107. During the introduction of the detergent, this pressure is measured at the chemical supply 102 by means of the power consumption of the electrical dosing pump. As described above, in this way, the total volume of the current introduced liquid can be determined. At the same time, the electronic dosing pump measures the injected volume of the detergent and controls the supply line in such a way that a predetermined mixing ratio is achieved.

Upon reaching the predetermined mixing ratio and a predetermined volume, the mixture found in the feed line 110 and the distributor lines 106, 107 is ejected by pressurised air being supplied with a high pressure, for example 6 bar, in the air supply 103. The valves 106*a*, 107*a* are opened, for example by means of electrical signals, and the mixture can be sprayed out through the nozzles 108, 109.

Furthermore, it is provided in the exemplary embodiment that a flow of water is emitted through the nozzles 108, 109 after emitting the mixture, wherein the feed line 110, the T-piece 105 and the distributor lines 106, 107 as well as the nozzles 108, 109 are cleaned. In addition, running on can be avoided by the nozzles 108, 109 being supplied with pressurised air on the end in order to eject the remaining liquid.

Mixing the liquids introduced can occur in the device by these being simultaneously introduced. However, a homogenous mixing does not necessarily have to be achieved, but rather the components of the mixture being homogenously mixed by the application with high-pressure outside the device can suffice.

In a further exemplary embodiment, the liquids are provided by the same supply unit, in particular one after the other. For example, a pump can be provided which firstly introduces water and then a detergent into the storage container 4, 204.

In yet another exemplary embodiment, the pressurised bladder 116, 117 in the device according to FIG. 3 is dispensed with. In this case, the gas found in the feed line 110 and the distributor lines 106, 107 is superseded by the supplied liquid, such that the gas accumulates in the upper part of the feed line 110 and is compressed there. The air supply 103 is also in this upper region, via which air supply pressurised air can be supplied with high pressure.

Thus, in this case, firstly the blocking devices 106*a*, 107*a* are closed and the liquids are dosed, that is to say against the gas pressure inside the feedline 110 and the distributor lines 106, 107. Since the system is closed in a gas-tight and pressure-tight manner, the gas pressure in the reservoir volume is increased, which is formed by the feed line 110 and the distributor lines 106, 107. The geometry of the feed line 110 and the distributor lines 106, 107 is formed in such a way that the gas can flow past the dosed liquid, such that the gas accumulates in the upper part of the supply volume. In the ejection process, pressurised air is supplied with a pressure in the upper part of the reservoir volume by means of the air supply 103. At the same time, the blocking devices 106*a*, 107*a* are opened. The pressure of the pressurised air is, in particular, greater than the pressure of the compressed gas in the reservoir volume. However, it can also be lower than the pressure of the compressed gas in the reservoir volume, since opening the blocking devices 106*a*, 107*a* leads to a pressure drop of the gas in the upper part of the reservoir volume. The liquid is then forced out of the reservoir volume by the pressurised air.

In further exemplary embodiments, it is provided that the storage container 4, 204 is not formed in a gas-tight manner, but rather has further openings, for example. In this case, when introducing the liquids, an increased internal gas pressure is not constructed, and the amount of liquid introduced must be measured in a different way. In this case, a float can be used, for example, in order to detect the volume of the liquid introduced. Furthermore, a flow path sensor is provided which measures the volume of one of the liquids introduced, for example the volume of the detergent supplied. Using the total volume and the volume of the second liquid, the mixing ratio can be determined, and the introduction is correspondingly adjusted. If it is ascertained that the predetermined total volume and the predetermined mixing ratio have been reached, the ejection of the mixture from the storage container 4, 204 is initiated, for example by means of a pump. Alternatively, the supply container 4, 204 can be closed in a gas tight manner for the ejection, and an ejection can be carried out by means of pressurised air, as described above.

LIST OF REFERENCE NUMERALS 1, 101, 201 First supply line, water supply
1a, 101a, 201a Check valve
1b, 101b, 201b Needle valve, throttle
201c Electromagnetic water valve
2, 102, 202 Second supply line, chemical supply
2a, 102a, 202a Check valve
3, 103, 203 Air supply
3a, 103a, 203a Check valve
4, 204 Storage container
5, 105, 205 Branching line, T-piece
6, 7, 106, 107, 206, 207 Distributor line
106a, 107a Blocking device, overpressure valve
8, 9, 108, 109 Ejection element, nozzle
10, 110, 210 Feed line
11, 211 Supply opening
12, 212 Removal opening
15, 215 Blocking device, blocking valve
116, 117 Pressure bladder
222 Supply unit, electrical dosing pump
222a Pressure detection element
223 Removal device, gas supply unit
230 Control unit
231 Detection unit

The invention claimed is:

1. A liquid ejection device for a vehicle washing system, the device comprising:
 a reservoir volume;
 a first supply line coupled upstream to the reservoir volume for supplying a first liquid with a first supply rate;
 a second supply line coupled upstream to the reservoir volume for supplying a second liquid with a second supply rate;
 a removal line coupled downstream to the reservoir volume with a blocking device for blocking a liquid flow through the removal line;
 a detection unit for detecting a liquid volume in the reservoir volume and a mixing ratio of the liquids introduced into the reservoir volume;
 a removal device for ejecting the liquid found in the reservoir volume with an ejection rate through an ejection element coupled to the removal line; and
 a control unit which is coupled to the detection unit and the removal device and is set up to start an ejection process by means of the removal device upon reaching a predetermined liquid volume and a predetermined mixing ratio,
 wherein the control unit is further coupled to a supply device for the second liquid, and
 the supply device comprises a pressure detection element for detecting an internal gas pressure in the reservoir volume, the pressure detection element being coupled to the detection unit.

2. The device according to claim 1, wherein the removal device is formed in such a way that the removal rate is greater than the sum of the maximum achievable first and second supply rates.

3. The device according to claim 1, wherein the supply device is set up to regulate the second supply rate in such a way that the predetermined mixing ratio of the first and second liquids is achieved in the reservoir volume.

4. The device according to claim 3, wherein the supply device comprises an electrical dosing pump.

5. The device according to claim 1, wherein the first liquid can be introduced with a constant volume flow.

6. The device according to claim 1, wherein the detection unit comprises a throughflow sensor for detecting the introduced volume of the first liquid and/or the second liquid.

7. The device according to claim 1, wherein the removal device comprises a gas supply unit, and the control unit is set up to open the blocking device during the ejection process and to introduce an expulsion gas into the reservoir volume through the gas supply unit in such a way that the mixture of the first and second liquids is driven out of the reservoir volume.

8. The device according to claim 1, wherein the reservoir volume is formed completely from a liquid line.

9. The device according to claim 8, wherein the length of the liquid line is at least one hundred times the line diameter.

10. The device according to claim 8, wherein the liquid line is provided with a pressure membrane bladder or an air chamber.

11. The device according to claim 8, wherein the geometry of the liquid line is formed in such a way that the gas found in the liquid line can flow past the dosed liquid, such that the gas accumulates in the upper part of the liquid line.

12. The device according to claim 1, wherein a branching line is arranged downstream of the blocking device for distributing the ejected liquid to at least two ejection elements.

13. The device according to claim 1, wherein the detection unit is set up to detect the liquid volume in the reservoir volume by means of the internal gas pressure in the reservoir volume that is detected by the pressure detection element.

14. The device according to claim 1, wherein the ejection element comprises a nozzle.

15. The device according to claim 1, wherein the ejection element comprises a pressure regulator.

16. A liquid ejection device for a vehicle washing system, the device comprising:
 a reservoir volume;
 a first supply line coupled upstream to the reservoir volume for supplying a first liquid with a first supply rate;
 a second supply line coupled upstream to the reservoir volume for supplying a second liquid with a second supply rate;
 a removal line coupled downstream to the reservoir volume with a blocking device for blocking a liquid flow through the removal line;
 a detection unit for detecting a liquid volume in the reservoir volume and a mixing ratio of the liquids introduced into the reservoir volume;
 a removal device for ejecting the liquid found in the reservoir volume with an ejection rate through an ejection element coupled to the removal line;
 a control unit which is coupled to the detection unit and the removal device and is set up to start an ejection process by means of the removal device upon reaching a predetermined liquid volume and a predetermined mixing ratio; and
 a pressure detection element for detecting an internal gas pressure in the reservoir volume, the pressure detection element being coupled to the detection unit,
 wherein the reservoir volume is sealed in a gas-tight manner such that introducing the first liquid and/or the second liquid into the reservoir volume leads to an increase of the internal gas pressure in the reservoir volume.

17. The device according to claim 16, wherein the detection unit is set up to detect the internal gas pressure in the reservoir volume when introducing the second liquid into the reservoir volume, the detection unit being set up to determine the liquid volume in the reservoir volume by means of the detected internal gas pressure in the reservoir volume.

18. The device according to claim 16,
wherein the control unit is further coupled to a supply device for the second liquid, and
the supply device for the second liquid comprises the pressure detection element for detecting the internal gas pressure in the reservoir volume.

19. The device according to claim 16, wherein the detection unit is set up to detect the internal gas pressure in the reservoir volume when introducing the first liquid and/or the second liquid into the reservoir volume, the detection unit being set up to determine the liquid volume in the reservoir volume by means of the detected internal gas pressure in the reservoir volume.

20. A liquid ejection device for a vehicle washing system, the device comprising:
a reservoir volume;
a first supply line coupled upstream to the reservoir volume for supplying a first liquid with a first supply rate;
a second supply line coupled upstream to the reservoir volume for supplying a second liquid with a second supply rate;
a removal line coupled downstream to the reservoir volume with a blocking device for blocking a liquid flow through the removal line;
a detection unit for detecting a liquid volume in the reservoir volume and a mixing ratio of the liquids introduced into the reservoir volume;
a removal device for ejecting the liquid found in the reservoir volume with an ejection rate through an ejection element coupled to the removal line; and
a control unit which is coupled to the detection unit and the removal device and is set up to start an ejection process by means of the removal device upon reaching a predetermined liquid volume and a predetermined mixing ratio,
wherein the control unit is further coupled to a supply device for the second liquid,
the supply device comprises a pressure detection element for detecting an internal gas pressure, the pressure detection element being coupled to the detection unit, and
the pressure detection element is set up to detect a power consumption of the supply device and to determine the internal gas pressure by means of the power consumption.

\* \* \* \* \*